(12) United States Patent
Cognigni et al.

(10) Patent No.: US 7,941,377 B2
(45) Date of Patent: May 10, 2011

(54) METHOD AND APPARATUS FOR METERING USAGE OF SOFTWARE PRODUCTS WITH AUTOMATIC CATALOG POPULATION

(75) Inventors: Giorgio Cognigni, Rome (IT); Bernardo Pastorelli, L'Aguilla (IT); Bruno Portaluri, Bari (IT)

(73) Assignee: International Business Machines Corporation, Armonk, NY (US)

( * ) Notice: Subject to any disclaimer, the term of this patent is extended or adjusted under 35 U.S.C. 154(b) by 1221 days.

(21) Appl. No.: 11/227,027

(22) Filed: Sep. 15, 2005

(65) Prior Publication Data
US 2006/0064382 A1    Mar. 23, 2006

(30) Foreign Application Priority Data

Sep. 21, 2004   (EP) .................................. 04104574

(51) Int. Cl.
*G06F 21/00* (2006.01)
(52) U.S. Cl. ............................................ 705/51; 705/52
(58) Field of Classification Search ............... 705/50–59
See application file for complete search history.

(56) References Cited

U.S. PATENT DOCUMENTS 5,590,056 A * 12/1996 Barritz .......................... 702/186

* cited by examiner

*Primary Examiner* — Andrew J. Fischer
*Assistant Examiner* — Chrystina Zelaskiewicz
(74) *Attorney, Agent, or Firm* — Yee & Associates, P.C.; Jeffrey S. LaBaw

(57) ABSTRACT

A method and a corresponding apparatus for metering usage of software products on a computer are proposed. The metering system is based on the use of a software catalogue. The software catalogue lists all the known products to be metered; each product is identified by one or more executable modules indicative of its running. A licensing agent detects the executable modules that have been launched. For each executable module, the system checks if a corresponding product is listed in the catalogue, and can decide an appropriate action, or simply meter the usage of the product for future reporting and invoicing activity. If no corresponding product is found in the catalogue, the method according to the present invention performs a similarity check between the unknown detected module and the product identifiers existing on the catalogue. Sometimes the difference between a new product and a catalogued one is very limited. If such difference is evaluated to be within a predetermined threshold, than the unknown module is added to the catalogue.

19 Claims, 4 Drawing Sheets

METHOD AND APPARATUS FOR METERING USAGE OF SOFTWARE PRODUCTS WITH AUTOMATIC CATALOG POPULATION

TECHNICAL FIELD

The present invention relates to the data processing field. More specifically, the present invention relates to a method of controlling and metering usage of software products on a data processing system. The invention further relates to a computer program for performing the method, and to a product embodying the program. Moreover, the invention also relates to a corresponding apparatus.

BACKGROUND ART

Software products (such as computer programs) can be perfectly reproduced in an infinite number of copies. This is a major concern for publishers of the products wishing to protect their intellectual property rights; indeed, the publishers typically receive a royalty for a licensed use of each product, so that any unaccounted use or distribution of the product results in unpaid royalties. The problem has been exacerbated in the last years by the widespread diffusion of the Internet, which further facilitates the uncontrolled distribution of this kind of products.

The most straightforward way of avoiding unaccounted usage of the products is that of preventing unauthorized copying and transmission. For example, some products embed control code that limits the number of copies that can be made or disables operation of the products after a predetermined period of time has lapsed. Another technique consists of requiring possession of a software or hardware key for running the products. A different solution consists of modifying each product to include a call to a licensing management system. Every time the product is started, a corresponding request is transferred to the licensing management system. The licensing management system verifies whether the usage of the product is authorized. If the result of the verification is positive, the product can continue its execution; otherwise, the product is forced to stop.

However, the technique described above requires each product to be modified by the publisher, so that they are not of general applicability. In addition, the solutions known in the art are quite rigid and cannot be readily adapted to different requirements.

A different approach is based on the use of a software catalogue. The software catalogue lists all the known products to be metered; each product is identified by one or more executable modules indicative of its running. In this case, a licensing agent working in the background detects the executable modules that have been launched; the licensing agent then identifies the corresponding products through the software catalogue.

For this purpose, the licensing agent periodically collects a list of the executable modules that are currently running. For each executable module, the system checks if a corresponding product is listed in the catalogue, and can decide an appropriate action, or simply meter the usage of the product for future reporting and invoicing activity. If no corresponding product is found in the catalogue, the product is normally flagged as unknown and the intervention of a system administrator is normally needed to update the catalogue. Sometimes the difference between a new product and a catalogued one is very limited. Also it is possible that the "unknown" detected executable module it's just a new module of a product already listed in the catalogue. Until the catalogue is not up to date the metering and controlling activities are not possible. Obviously this manual population has some drawbacks due to the cost and the complexity of the human intervention and the delay between the detection of the unknown module and the insertion of the corresponding new entry in the catalogue.

It is an object of the present invention to provide a method and a system which alleviates the above drawbacks.

SUMMARY OF THE INVENTION

According to the present invention we provide a method of metering usage of software products on a data processing system, the method including the steps of: detecting an event indicative of the use of at least one product module on the system; checking on a catalogue, containing a plurality of product identifiers, if the at least one product module has a corresponding product identifier; if the at least one product module has no corresponding product identifier, determining a matching score indicative of the similarity of said product module with each of the plurality of product identifiers; responsive to the highest of said matching scores satisfying predetermined threshold criteria, adding an entry in the catalogue corresponding to said product module.

In this way, when an unknown module is detected, the system evaluates if its similarity with an existing one exceeds a predetermined threshold. In such case the new module is added to the catalogue.

A further aspect of the present invention provides a computer program for performing the above-described method.

A still further aspect of the invention provides a program product embodying this program.

Moreover, another aspect of the invention provides a corresponding apparatus for metering usage of software products.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
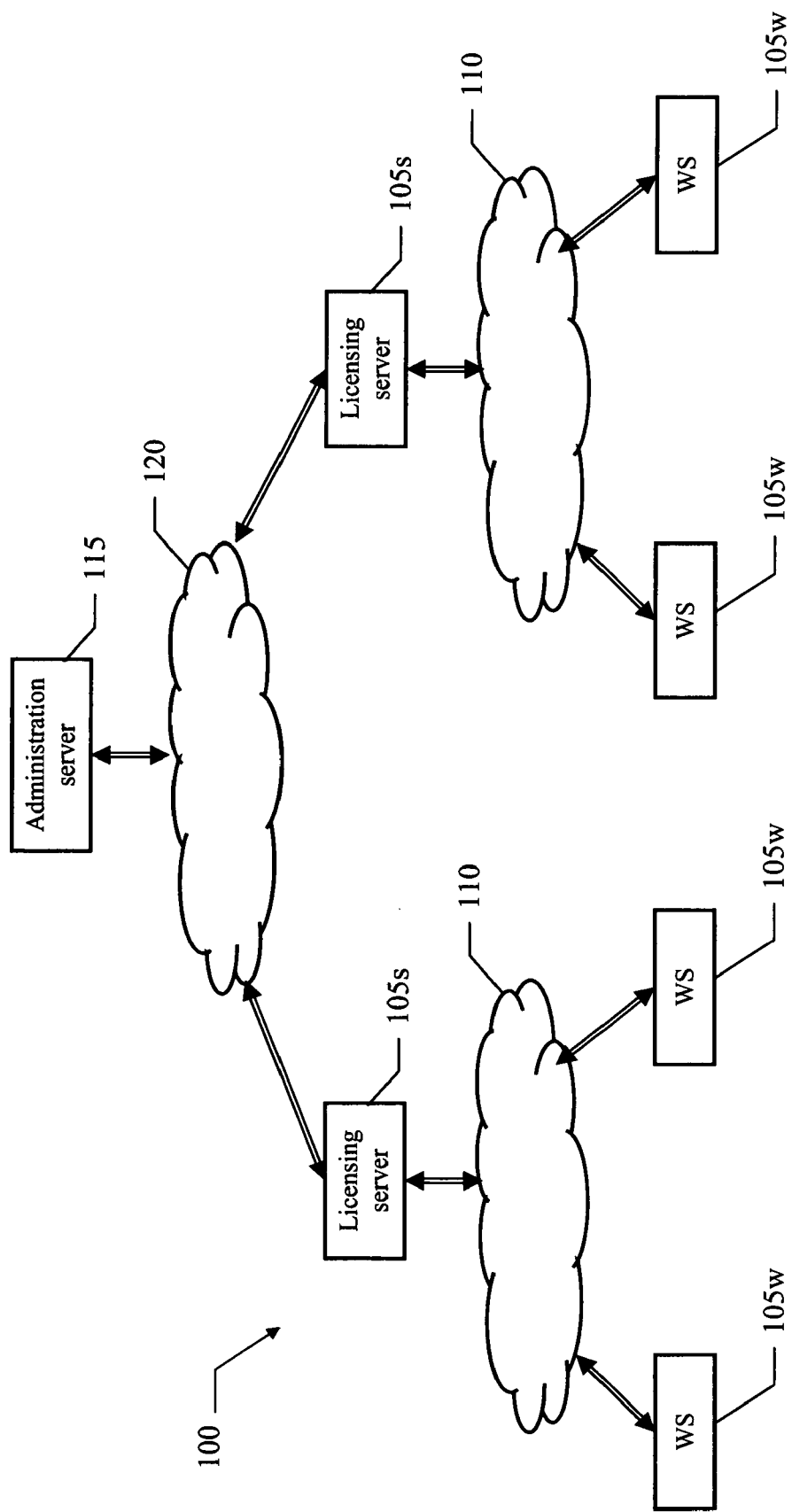
FIG. 1a is a schematic block diagram of a data processing system in which the method of the invention is applicable.

With reference in particular to FIG. 1a, a data processing system 100 with distributed architecture is depicted. The system 100 includes multiple workstations 105w, which are grouped into different sets; a licensing server 105s is associated with the workstations 105w of each set. The licensing server 105s and the corresponding workstations 105w are connected to each other through a network 110 (for example, a LAN). The different licensing servers 105s communicate with a remote administration server 115 through a different network 120 (for example, INTERNET-based); the administration server 115 implements a central repository where usage, procurement and inventory data of the system 100 is collected and managed.

Figure 1B:
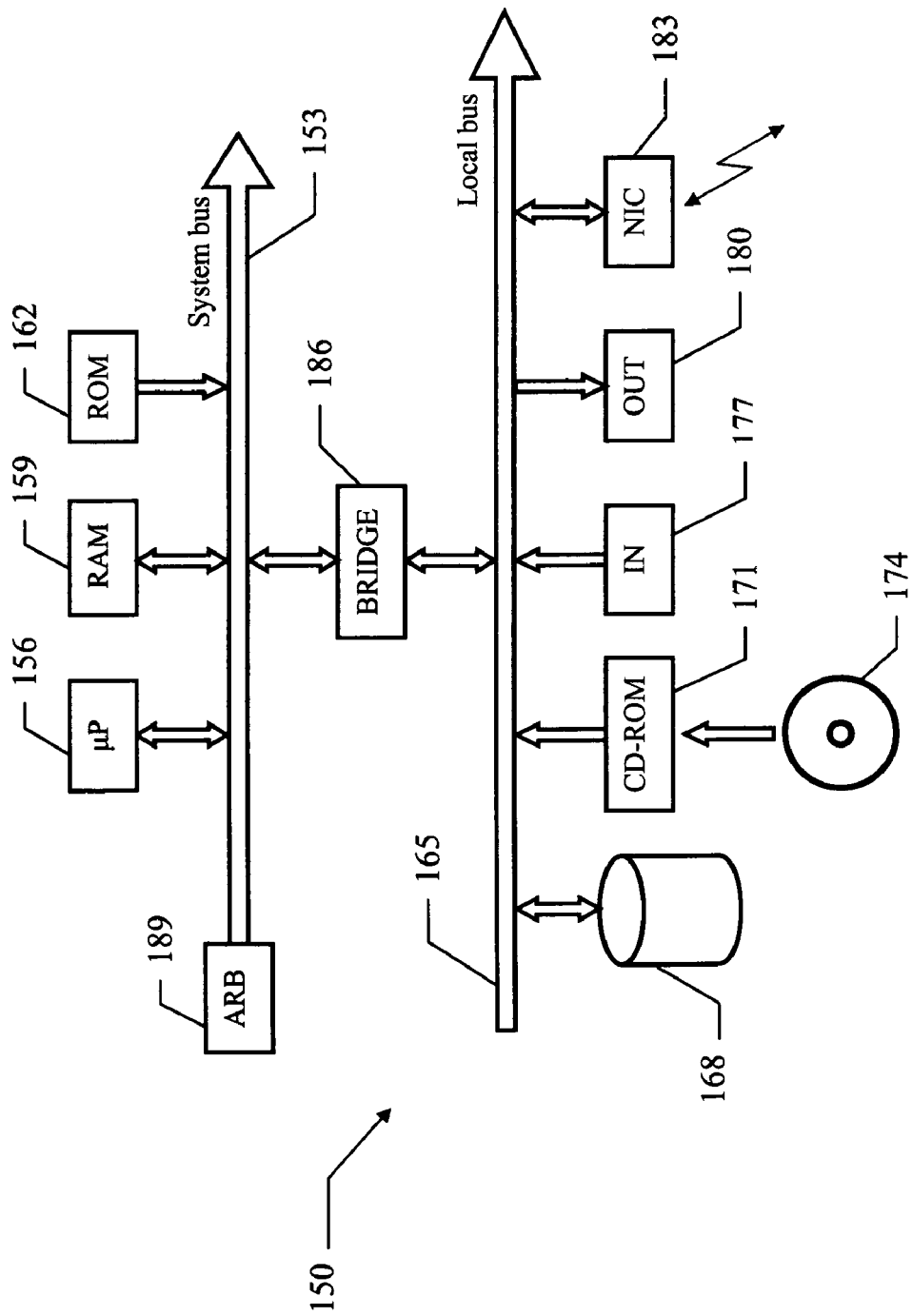
FIG. 1b shows the functional blocks of a generic computer of the system.

As shown in FIG. 1*b*, a generic computer of the system (workstation, licensing server, or administration server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer.

Figure 2:
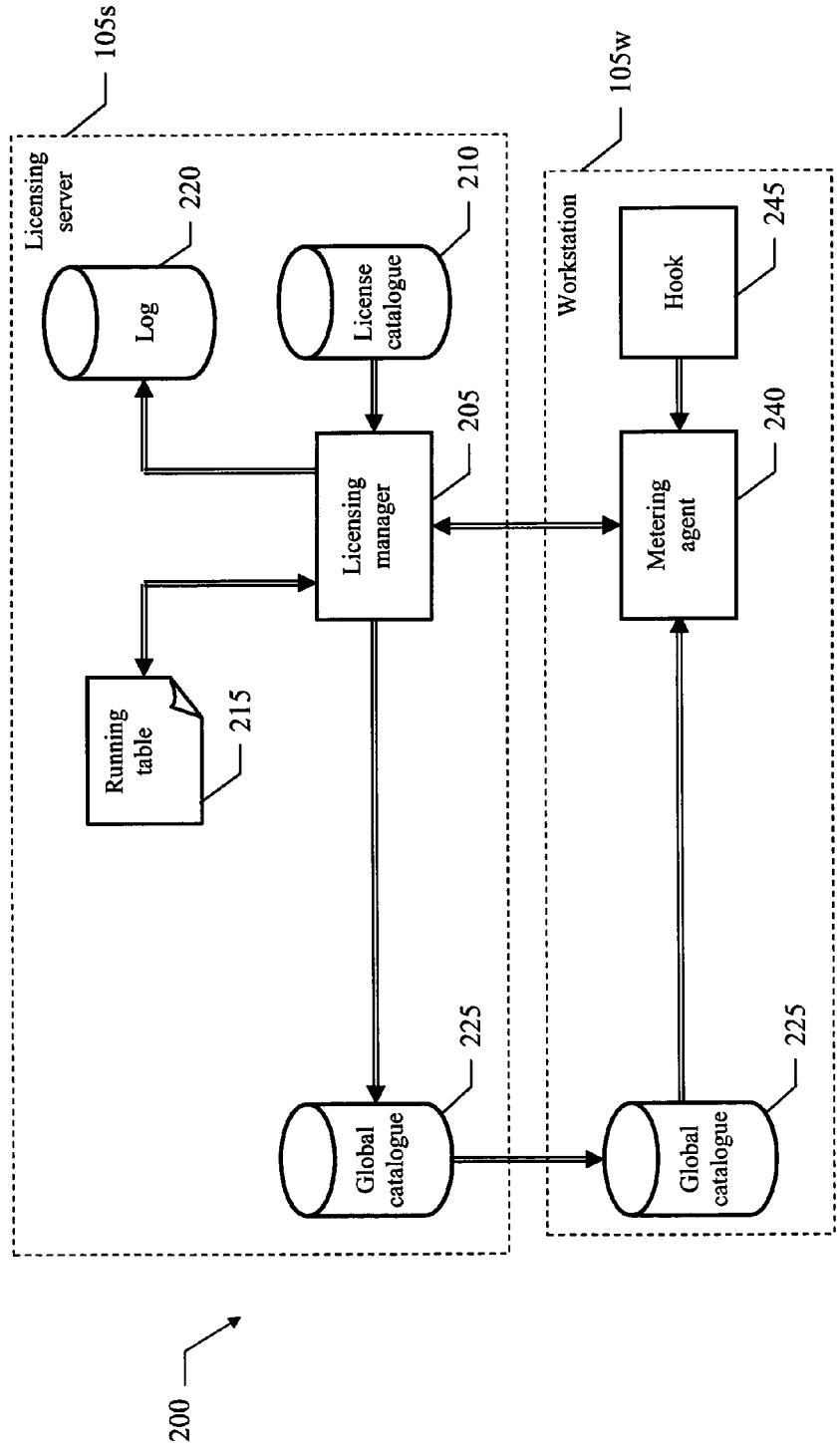
FIG. 2 depicts the main software components that can be used for practicing the method.

Considering now FIG. 2, the main software components that can be used to practice the method of a preferred embodiment of the invention are denoted as a whole with 200. The information (programs and data) is typically stored on the hard-disks of the different computers and loaded (at least partially) into the corresponding working memories when the programs are running.

Considering in particular a generic licensing server 105*s*, a corresponding manager 205 controls the associated workstations 105*w* (only one shown in the figure). The licensing manager 205 accesses a license catalogue 210, which contains information about the authorised conditions of use of different software products; for example, the authorisation catalogue 210 specifies the maximum processing power or the maximum capacity of the working memories of the workstations 105*w* on which each product can run, the number of licenses for the product (defining the maximum number of instances of the product allowed to run concurrently), and the like. Typically, more than one license is available for each product. The licensing manager 205 also controls entering of information into a running table 215, which lists the products currently in execution on the workstations 105*w*. In addition, the licensing manager 205 collects information from the corresponding workstations 105*w* (for example, about the installed programs, any attempts to run non-authorised or unknown products, and the like); this information is stored into a corresponding log 220.

The licensing server 105*s* also stores a global software catalogue 225, which is distributed to each workstation 105*w*. The global catalogue 225 lists all the known products to be metered in the system; each product has a corresponding product identifier.

The global catalogue 225 is accessed by a metering agent 240 running in the background. The metering agent 240 also interfaces with a hook module 245. The hook 245 is implemented by means of a kernel extension, which adds functionality to an operating system of the workstation 105*w* using publicly available, standard interfaces. The hook 245 intercepts the starting of any new process on the workstation 105*w*, and reports the name of the corresponding executable module that has been invoked to the metering agent 240. The metering agent 240 determines the product (corresponding to the invoked executable module) that has been launched. The name of the product being launched is then transmitted to the licensing manager 205. The licensing manager 205 checks if a corresponding license is available on the license catalogue 210 and grants or denies the authorization to run the product accordingly (using the license catalogue 210 and the running table 215). If no license is found the system just meters the usage if the product for future use or reporting activities. The result of the process is stored into the log 220 and it is returned to the metering agent 240 (updating the running table 215 if necessary).

When the executable module does not find a matching entry in the global catalogue 225 the system compares the information gathered by the detected "unknown" module with the information of the existing product identifiers. A module is normally defined with a number of variables which can be dependent one from the other. For example for a module M1 belonging to a product P1, there is an associated Product Name, a Product Version and a Product release. These information identify the associated product. In addition the module can have a Module Name and a Module Size. When a new executable module is added or a new product version or new product release is introduced, the system detects a module which does not find an exactly matching entry on the catalogue. According to the present invention a comparison between the unknown module and the existing entries is made. A score is calculated for each comparison and the highest score is then considered. If the highest score reaches a predetermined threshold, then the unknown module is entered in the catalogue, i.e. a new entry is added with all the information gathered by the system. According to an embodiment of the invention, the new entry could be also integrated with additional information (e.g. the SW vendor name and references) obtained by the existing entry.

When a product is installed, it saves additional information needed to correctly uninstall the software. These data are maintained in a centralized Operating System registry or in product related repositories. Usually they contain also information about the product itself (like the name, version or vendor name) and is used to display to the customer the list of installed software when he wants to uninstall one of them.

These information can be read from such repositories and collected in a centralized server. Some considerations must be done to understand the reliability of such information:

The product name retrieved from the endpoint repository may be different from the one in the software catalog.
    The product vendor may not be present
    The product information may be wrong or misspelled
    The general idea is to provide a strategy (or algorithm) to calculate a 'matching score' of each unknown product to understand how much the discovered software is similar or is a subcomponent of a product already present in the catalog. Unknown products with higher matching scores can be moved in the software catalog enriching (or normalizing) product information with the matched product.

An advantage of this solution is that, as soon as a product version or patch is installed and used, the catalog is filled with information about it. This is realised without prejudice to the reliability of the catalogue.

Also useful information could be provided to a system administrator in case the unknown module does not reach the minimum predetermined threshold. In such case the human intervention is needed, but many information are readily available The following are some examples of how to calculate the matching score for the evaluation:

Example Matching Score 1:

The Matching score 1 provides a probability that can be used by the system to determine the level of reliability of the unknown products/files, considering its name, version and release.

For a given unknown file the following information are available:

Product name
Product version
Product version release

Usually the version/release field (as retrieved from the installation database) is formatted in version.release.maintenance.other-information format. Before entering the algorithm this field should be normalized to version.release format. This will facilitate the version field match with the entries defined in the catalog. When this is not possible the algorithm is not applicable and the score will be 0.

This score can be calculated as follows:

1: If the unknown product name and version matches with a product name and version in the catalog (or an alias).

0.8: If the unknown product name matches with at least one product name in the catalog (or an alias) and the Product version matches with at list one version of that product, even if the release is a different one; this could be the case of a new release being introduced, but not added to the catalogue yet;

0.5: If the unknown product name matches with at least one product name in the catalog (or an alias) but has a different version;

Under these level it could be necessary to introduce a more complex evaluation, which considers the level of similarity between the product name of the unknown module and the product names of existing entries in the catalogue.

Example Matching Score 2:

The Matching Score 2 is used to determine the probability that an unknown file belongs to a specific product (top level of the product hierarchy) in the software catalog. In this case the product name does not exactly match with any existing one, so there is no points of considering product version or release. Matching score 2 will be based on two scores:

Words count score (WCS): based on how many words of the unknown file product name are present in the product we are looking.

Words order score (WOS): based on how the sequence of the words in the unknown file product name is similar to the word sequence of the product we are looking.

The two scores are defined as follows:

WCS=matched words/searched words

WOS=matched words in correct order/words count

The Matching Score 2 is defined as the average of the two scores:

MS2=(WCS+WOS)/2

Here are some examples that validate the proposed algorithm:

| Catalog. | Unknown | | | | | |
|---|---|---|---|---|---|---|
| | A | AB | BA | BC | CBA | AD |
| A | 1 | 0.75 | 0.75 | 0 | 0.67 | 0.75 |
| AB | 0.75 | 1 | 0.75 | 0.5 | 0.42 | 0.5 |
| ABC | 0.67 | 0.83 | 0.67 | 0.83 | 0.67 | 0.5 |
| BCA | 0.67 | 0.67 | 0.83 | 0.83 | 0.67 | 0.5 |
| CAB | 0.67 | 0.83 | 0.67 | 0.67 | 0.83 | 0.5 |

Example Matching Score 3

The Matching Score 3 can be used to determine the probability that an unknown file belongs to a specific product release in the software catalog.

For a given unknown file with the following information:

Product name
Product version
File name
File size

For each product release in the software catalog the Matching Score 3 will be based on three scores:

Words count score: based on how many words of the unknown file product name are present in the product release we are looking.

Words order score: based on how the sequence of the words in the unknown file product name is similar to the word sequence of the product release we are looking.

Linked modules score: based on size difference between the unknown file and the modules in the software catalog that have the same file name.

For a given unknown file a list of modules with the same file name can be retrieved. Said UFS the Unknown File Size, for each module I with size MFSi (Module File Size) a 'Size Distance' (SDi) can be calculated as follows:

$$SDi=ABS(UFS-MFSi)$$

Lets call MAXSD the maximum value:

$$MAXSD=MAX(SDi)$$

For each product release the Linked Modules Score (LMS) con be calculated as follows:

LMS=0 (if there are no linked modules with the same name)

LMS=AVG(MAXSD/SDi)

where SDi are the Size Distances of the modules linked to the product release.

This will boost the score of the product that have a linked file with the same name and a minimum size difference.

The overall Matching Score 3 is defined as the average of the three scores:

$$MS3=MAX(WCS+WOS+LMS)/3$$

Since WCS, WOS and LMS are numeric values between 0 and 1, the MS3 will be a number between 0 and 1.

It is even possible to combine two of the above described methods, for example adding to the list of scores of the example 1 above a lower probability, e.g. X/3, where x is the results of Matching score 2 or matching score 3:

X/3: Where X is the highest Matching Score 2 (or Matching score 3) calculated for all product identifiers in the software catalog.

Once a matching score (the highest of all possible matching scores) is established it is compared with a threshold, to decide whether to add the new module to the catalogue or not. This threshold can be customized by the system administrator, who can decide which level of reliability requiring for allowing an automatic catalogue population. When the decision of adding an entry to the global catalogue is taken, the process proceeds as follows:

if the product name, version and release are already in the catalogue, the module is added and simply linked to the existing entry;

if the product name and version are in the catalogue, a new release is added and associated with the existing version. The module is then added and linked to the new release;

if only the product name is in the catalogue, a new version is added and linked to the existing product name. Then the release is added and linked to the new version. Finally, the module is added and linked to the release;

otherwise, the product name is added together with the version and release and they are linked to each other. Then the module is added and linked to the new release.

Figure 3:
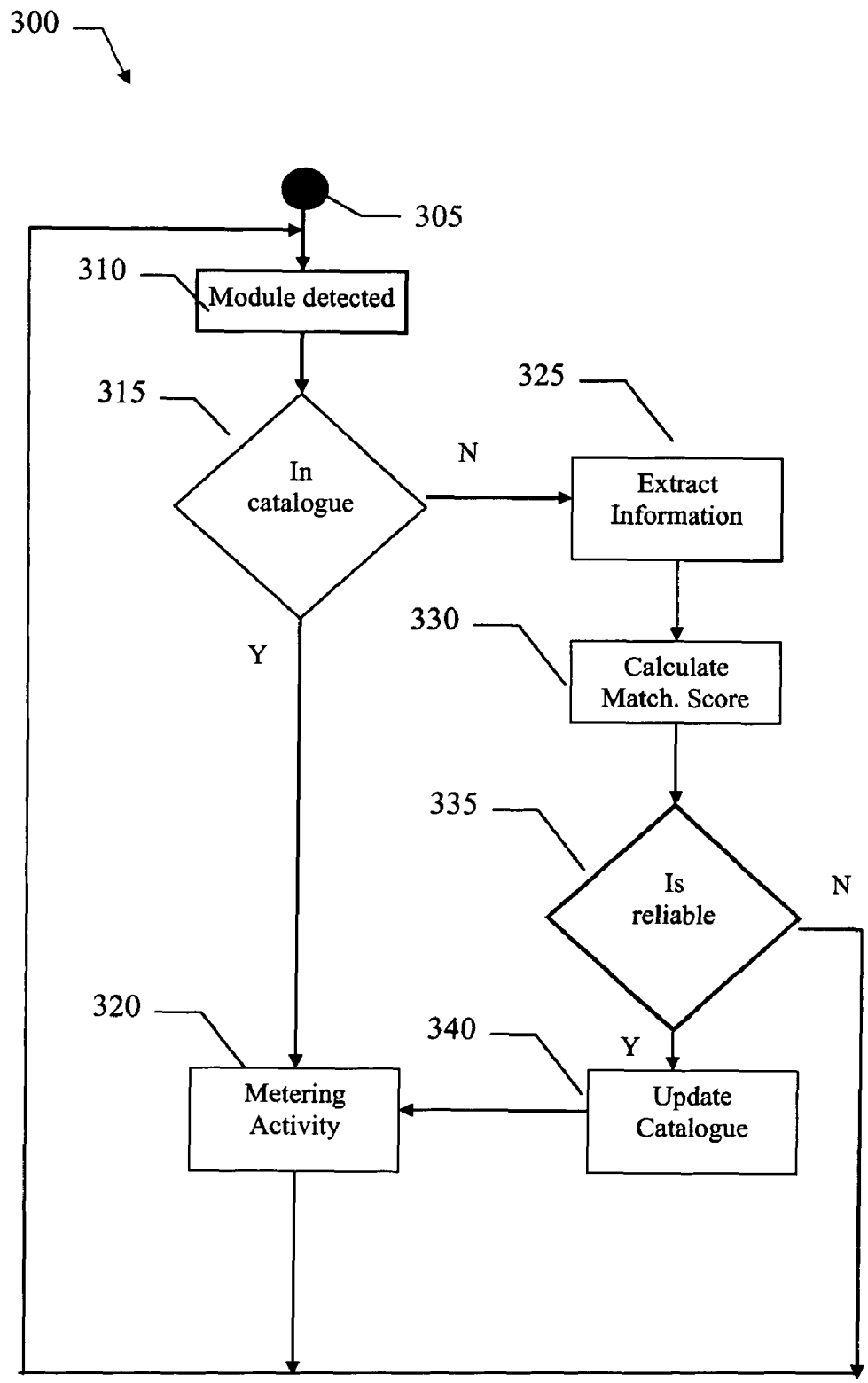
FIG. 3 show a diagram describing the flow of activities relating to an illustrative implementation of the method.

Considering now FIG. 3, the logic flow of a metering process according to an embodiment of the invention is represented with a method 300. The method begins at the black start circle 305. Continuing to block 310, a module is detected by the hook 245. If the detected module has a corresponding product identifier (step 315) in the global catalogue 225, then the process continues with the normal metering activities (320). If no matching entry is found then the process goes to step 325 where the information on the detected module are obtained. Then the control goes to step 330 for the determination of the highest matching score as detailed in the examples above. At step 335 the highest matching score is compared with a predetermined threshold to decide whether the detected module can be entered in the catalogue or not. If the matching score does not satisfy the minimum threshold, then the process ends and the control goes back to the beginning. Otherwise (step 340) the module is added to the global catalogue 225 and the process continues to the step 320 with the normal metering activities. It is to be noted that the possibility of determining and customising the comparing threshold gives a great flexibility to the system, as the system administrator can decide which level of reliability require for updating the catalogue.

Similar considerations apply if the programs and data are structured in a different manner, if other modules or functions are provided, or if the information is stored in equivalent memory structures. In any case, the solution of the invention is also suitable to be implemented with a licensing manager that meters and/or controls the authorisations to run the products directly on each workstation. The system could even just meter the usage and keeping track of the corresponding information without performing any control activity, based on available licenses.

As an example, the updating of the global catalogue 225 described above could be performed in a batch mode, as well as in real time. In the same way the global catalogue can be distributed to each workstation (as described above) or being maintained only on the server.

Similar considerations apply if the method includes equivalent or additional steps.

Alternatively, for example different methods of obtaining the information on the detected module can be used, depending also on the operating system on which the system is installed.

Although not described in detail in order to avoid obscuring the description of the invention with unnecessary details, it is obvious that a procedure is also provided for notifying the licensing manager when the execution of a product is terminated (so as to update the table of available licenses). In addition, it is possible to have each workstation send a heartbeat message to the licensing manager periodically (for example, every ten minutes); in this way, the products running on the workstation can be deleted from the running table (in order to release the respective licenses) if the heartbeat message is not received within a predefined period (meaning that the workstation is not working correctly). Moreover, the administration server periodically collects the information logged on the different licensing servers, in order to create different reports (for example, relating to the installation and/or usage of the products on the workstations).

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

For example, the use of the proposed solution in a context different than the licensing management is contemplated. Particularly, the information that has been detected about the products can be used for reporting or inventory purposes only (without any verification of their authorizations). Alternatively, the products are always allowed to run (for example, only logging an exception when their use is not authorized). Also it is to be noted that the term "use" when referred to a software product may include the simple installation or loading of the product in the system memory.

In any case, the method of the invention can be used to meter any kind of software products (such as video games, multimedia works, and the like); moreover, the launch of the products can be detected in another way (for example, periodically collecting a list of the executable modules that are running).

In addition, the programs can be distributed on any other computer readable medium (such as one or more DVDs); alternatively, the programs are pre-loaded onto the harddisks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of metering usage of software products on a data processing system, the method including the steps of:
   detecting an event indicative of the use of at least one product module on the data processing system;
   checking a catalogue containing a plurality of product identifiers to determine if the at least one product module has a corresponding product identifier;
   responsive to a determination that the at least one product module has no corresponding product identifier, determining a matching score indicative of a similarity of the at least one product module with each of the plurality of product identifiers; and responsive to a highest of said matching scores satisfying a threshold, adding an entry in the catalogue corresponding to said product module.

2. The method according to claim 1, wherein the determining step includes:

comparing a set of parameters associated to the at least one product module with a corresponding set of parameters associated to the product identifiers.

3. The method according to claim 1, wherein the step of adding an entry in the catalogue includes the step of:

associating the at least one product module to a product identifier for which the highest of said matching score has been determined.

4. The method according to claim 3 wherein the at least one product module inherits information contained in the associated product identifier.

5. The method according to claim 2 wherein the set of parameters includes a product name, a product version, and a product version release.

6. The method of claim 5 wherein the set of parameters are organized in a nested hierarchy and the comparing step is performed starting from the top of said nested hierarchy.

7. The method of claim 1, further comprising the steps of:

responsive to the highest of said matching scores not satisfying the threshold, flagging the at least one product module as unknown; and reporting detection of the unknown product module.

8. A computer program product comprising:

a computer usable medium having computer usable program code for metering usage of software products on a data processing system, the computer program product comprising:

computer usable program code for detecting an event indicative of the use of at least one product module on the data processing system;

computer usable program code for checking a catalogue containing a plurality of product identifiers to determine if the at least one product module has a corresponding product identifier;

computer usable program code, responsive to a determination that the at least one product module has no corresponding product identifier, for determining a matching score indicative of a similarity of the at least one product module with each of the plurality of product identifiers; and computer usable program code, responsive to a highest of said matching scores satisfying a threshold, for adding an entry in the catalogue corresponding to said product module.

9. An apparatus for metering usage of software products on a data processing system, the apparatus including:

a catalogue, containing a plurality of product identifiers;

detecting means for detecting an event indicative of the use of at least one product module on the data processing system;

means responsive to the detection, for checking the catalogue to determine if the at least one product module has a corresponding product identifier;

means, responsive to a failure of the checking step, for determining a matching score indicative of a similarity of said product module with each of the plurality of product identifiers; and means responsive to a highest of said matching scores satisfying a threshold, for adding an entry in the catalogue corresponding to said product module.

10. The apparatus according to claim 9, wherein the means for determining a matching score further comprises comparing a set of parameters associated to the at least one product module with a corresponding set of parameters associated to the product identifiers.

11. The apparatus according to claim 9, wherein the computer usable code to add an entry in the catalogue further comprises associating the at least one product module to a product identifier for which the highest of said matching score has been determined.

12. The apparatus according to claim 11 wherein the at least one product module inherits information contained in the associated product identifier.

13. The apparatus of claim 10, wherein the set of parameters includes a product name, a product version, and a product version release.

14. The computer program according to claim 8, wherein the program code means for determining a matching score further comprises comparing a set of parameters associated to the at least one product module with a corresponding set of parameters associated to the product identifiers.

15. The computer program according to claim 8, wherein the program code means for adding an entry in the catalogue further comprises associating the at least one product module to a product identifier for which the highest of said matching score has been determined.

16. The computer program according to claim 15 wherein the at least one product module inherits information contained in the associated product identifier.

17. The computer program according to claim 14 wherein the set of parameters includes a product name, a product version, and a product version release.

18. The computer program of claim 17 wherein the set of parameters are organized in a nested hierarchy and the comparing step is performed starting from the top of said nested hierarchy.

19. The computer program of claim 8, further comprising:

program code means for flagging the at least one product module as unknown in response to the highest of said matching scores not satisfying the threshold; and program code means for reporting detection of the unknown product module.

* * * * *